United States Patent
Barna

(10) Patent No.: US 9,106,068 B2
(45) Date of Patent: Aug. 11, 2015

(54) QUICK-RELEASE CORD GRIP

(71) Applicant: Kyle Steven Barna, Syracuse, NY (US)

(72) Inventor: Kyle Steven Barna, Syracuse, NY (US)

(73) Assignee: Cooper Technologies Company, Houston, TX (US)

( * ) Notice: Subject to any disclaimer, the term of this patent is extended or adjusted under 35 U.S.C. 154(b) by 148 days.

(21) Appl. No.: 13/889,434

(22) Filed: May 8, 2013

(65) Prior Publication Data

US 2014/0332249 A1 Nov. 13, 2014

(51) Int. Cl.
| | |
|---|---|
| H02G 3/04 | (2006.01) |
| F16L 3/12 | (2006.01) |
| F16L 3/00 | (2006.01) |
| H02G 3/32 | (2006.01) |

(52) U.S. Cl.
CPC ..................... H02G 3/32 (2013.01)

(58) Field of Classification Search
CPC ...................................................... H02G 3/83
USPC ........ 174/68.3, 70 R, 71 R, 72 R, 72 A, 73.1, 174/77 R, 74 R, 79, 95, 99 R, 135, 650, 652, 174/653, 656, 657, 659, 668, 665, 664, 151, 174/152 R; 439/587, 586; 277/602, 603, 277/616, 627; 248/74.1, 74.2, 49, 74.4
See application file for complete search history.

(56) References Cited

U.S. PATENT DOCUMENTS

| | | | |
|---|---|---|---|
| 2,788,385 A | 4/1957 | Doering et al. | |
| 3,233,205 A | 2/1966 | Sundquist | |
| 3,402,382 A | 9/1968 | DeTar | |
| 3,891,294 A | 6/1975 | Philibert | |
| 4,030,741 A | 6/1977 | Fidrych | |
| 4,548,465 A * | 10/1985 | White | 385/138 |
| 5,439,388 A | 8/1995 | Weiss et al. | |
| 5,618,206 A * | 4/1997 | Sawada et al. | 439/587 |
| 5,742,982 A * | 4/1998 | Dodd et al. | 24/16 R |
| 5,766,039 A | 6/1998 | Abe | |
| 6,071,148 A | 6/2000 | Radliff et al. | |
| 6,162,085 A | 12/2000 | Chugh et al. | |
| 6,180,882 B1 * | 1/2001 | Dinh | 174/655 |
| 6,196,865 B1 | 3/2001 | Ruffel et al. | |
| 6,211,465 B1 * | 4/2001 | Streit | 174/653 |
| 6,578,800 B2 * | 6/2003 | Stefan | 248/52 |

* cited by examiner

*Primary Examiner* — Angel R Estrada
*Assistant Examiner* — Dimary Lopez Cruz
(74) *Attorney, Agent, or Firm* — King & Spalding LLP

(57) ABSTRACT

A quick-release cord grip is described herein. The quick-release cord grip can include a damming device through which at least one conductor traverses, and a frame mechanically coupled to the damming device. The frame can include a first portion having a first receiving feature along a first inner surface, a first coupling feature, and a first fastening feature. The frame can also include a second portion having a second receiving feature along a second inner surface, a second coupling feature, and a second fastening feature. The first coupling feature and the second coupling feature can be movably coupled to each other. The first fastening feature and the second fastening feature can be detachably coupled to each other. The damming device can be disposed within the first receiving feature and the second receiving feature when the first fastening feature and the second fastening feature are mechanically coupled to each other.

20 Claims, 4 Drawing Sheets

QUICK-RELEASE CORD GRIP

TECHNICAL FIELD

The present disclosure relates generally to cord grips, and more particularly to systems, methods, and devices for a quick-release cord grip with liquid-proof capabilities.

BACKGROUND

Cord grips provide a way for passing a cord (also called a cable or a conductor herein) into an enclosure (e.g., junction box, switch, cabinet, plug, connector, push-button station, conduit). Once a conductor is passed through the cord grip, one or more portions of the cord grip can be used to tighten around the conductor, which gives the cord grip its name. A cord grip can provide strain relief for such conductors, and can be used in residential, commercial, institutional, and industrial applications. Cord grips can be found in various shapes and sizes, and can pass therethrough one or more of a number of conductors.

SUMMARY

In general, in one aspect, the disclosure relates to a quick-release cord grip. The quick-release cord grip can include a damming device through which at least one conductor traverses. The quick-release cord grip can also include a frame mechanically coupled to the damming device. The frame can include a first portion having a first receiving feature along a first inner surface, a first coupling feature, and a first fastening feature. The frame can also include a second portion having a second receiving feature along a second inner surface, a second coupling feature, and a second fastening feature. The first coupling feature and the second coupling feature can be movably coupled to each other. The first fastening feature and the second fastening feature can be detachably coupled to each other. The damming device can be disposed within the first receiving feature and the second receiving feature when the first fastening feature and the second fastening feature are mechanically coupled to each other.

In another aspect, the disclosure can generally relate to a wiring system. The wiring system can include an enclosure having at least one wall forming a cavity, where the at least one wall includes a first aperture that traverses therethrough. The wiring system can also include at least one conductor disposed within the cavity and that traverses the first aperture. The wiring system can further include a quick-release cord grip mechanically coupled to the enclosure at the first aperture. The quick-release cord grip can include a damming device through which the at least one conductor traverses, and a frame. The frame of the quick-release cord grip can include a first portion having a first receiving feature along a first inner surface, a first coupling feature, and a first fastening feature. The frame of the quick-release cord grip can also include a second portion having a second receiving feature along a second inner surface, a second coupling feature, and a second fastening feature. The first coupling feature and the second coupling feature can be movably coupled to each other. The first fastening feature and the second fastening feature can be detachably coupled to each other. The damming device can be disposed within the first receiving feature and the second receiving feature when the first fastening feature and the second fastening feature are mechanically coupled to each other.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
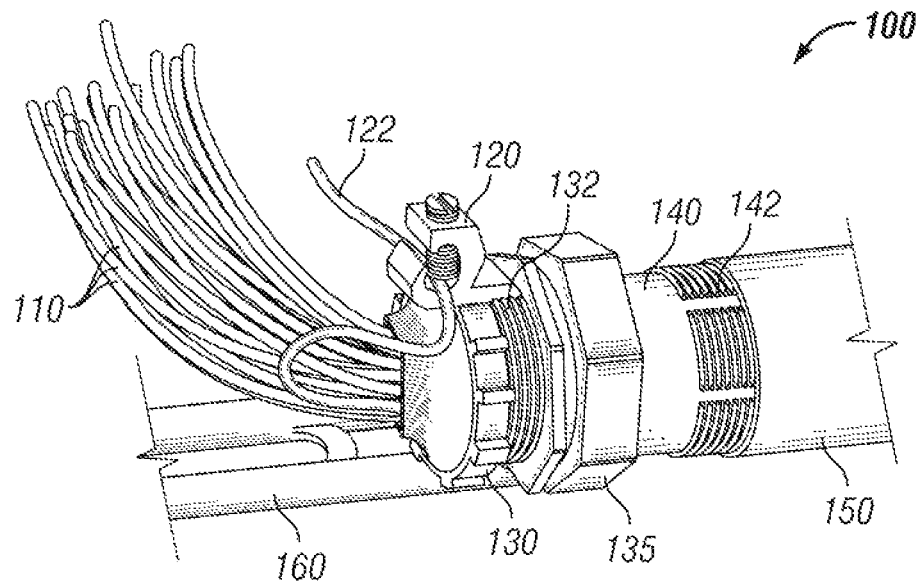
FIG. 1 shows a cord grip currently known and used in the art.

In general, example embodiments provide systems, methods, and devices for a quick-release cord grip. Like, but not necessarily the same or identical, elements in the various figures are denoted by like reference numerals for consistency. In the following detailed description of the example embodiments, numerous specific details are set forth in order to provide a more thorough understanding of the disclosure herein. However, it will be apparent to one of ordinary skill in the art that the example embodiments herein may be practiced without these specific details. In other instances, well-known features have not been described in detail to avoid unnecessarily complicating the description. As used herein, a length, a width, and height can each generally be described as lateral directions. Also, any numerical listing (e.g., first, second) of any components described herein are merely meant as distinguishing descriptions among such components and are not meant to indicate a priority or other specific order. Further, any orientation (e.g., top, bottom) of an example quick-release cord grip and/or of one or more of its components can be altered from what is described herein.

The quick-release cord grip can include a frame and a damming device. The damming device allows one or more conductors (e.g., cables, wires, cords) to pass through one or more holes. Each hole can provide a seal around the corresponding conductor. The seal formed by the damming device around the conductor prevents or reduces fluids from passing through the hole along the conductor. The damming device does not require disassembly of the quick-release cord grip to ensure proper function.

A user may be any person that interacts with an example cord grip. Examples of a user may include, but are not limited to, an engineer, an electrician, an instrumentation and controls technician, a mechanic, an operator, a consultant, a contractor, and a manufacturer's representative. As used herein, a diameter can be used to described a measurement across a circular surface or object. Alternatively, a diameter can be used generically as a term to describe a measurement across a non-circular (e.g., rectangular, square, oval, octagonal) surface or object.

Example embodiments of quick-release cord grips will be described more fully hereinafter with reference to the accompanying drawings, in which example embodiments of quick-release cord grips are shown. Quick-release cord grips may, however, be embodied in many different forms and should not be construed as limited to the example embodiments set forth herein. Rather, these example embodiments are provided so that this disclosure will be thorough and complete, and will fully convey the scope of quick-release cord grips to those or ordinary skill in the art. Like, but not necessarily the same, elements (also sometimes called components) in the various figures are denoted by like reference numerals for consistency.

FIG. 1 shows a perspective view of a cord grip 100 currently used in the art in an electrical system. The cord grip 100 can include a body 140, a locking feature 130, and a gripping member (hidden from view). The body 140 can be supported by an optional stand 160 and/or one or more of a number of other supporting members (e.g., bracket, clip, fastening device). In addition, or in the alternative, the body 140 can be mechanically coupled to an enclosure 150 (sometimes called an electrical enclosure), which in this case is a conduit.

The body 140 can be tubular in shape, forming a cavity. The gripping member can be disposed within the cavity of the body 140. The gripping member has a hole that traverses therethrough, and one or more conductors 110 are fed through the hole in the gripping member, as well as through the cavity of the body 140. The gripping member can be affixed inside the body 140 using one or more of a number of fastening features and/or methods, including but not limited to a slot, compression fittings, fusion, welding, and epoxy. The gripping member can be made of one or more of a number of compressible materials (e.g., rubber, nylon).

The locking feature 30 of the cord grip 100 can be a tubular component that is movably (e.g., rotatably) coupled to one end (e.g., the top end) of the body 140. The one or more conductors 110 that traverse the cavity of the body 140 also traverse a cavity formed by the locking feature 130. As the locking feature 130 moves in a certain direction relative to the body 140, the gripping member, disposed inside the body 140, is compressed. In some cases, one or more of a number of coupling features (e.g., mating threads, clips) can be disposed on a portion (e.g., an inner surface) of the locking feature. In such a case, complementary coupling features (e.g., mating threads, slots) can be disposed on one or more surfaces (e.g., the outer surface) of the end of the body 140. For example, as shown in FIG. 1, the locking feature 130 can have mating threads (hidden from view) disposed along its inner surface, while the top of the body 140 can have complementary mating threads 132 disposed on its outer surface. Such coupling features can be used to movably couple the locking feature 130 relative to the body 140 and cause the gripping member to loosen or tighten its grip on the conductors 110.

The body 140 of the cord grip 100 can also have other coupling features disposed on a different portion (e.g., the bottom end) of the body 140. Such other coupling features can be used to mechanically couple the body 140 of the cord grip 100 to the enclosure 150. For example, as shown in FIG. 1, the bottom of the body 140 can have mating threads 142 disposed along its outer surface, while inner surface of the proximal end of the enclosure 150 can have complementary mating threads 132 disposed on its inner surface.

The body 140 can include one or more other features. For example, a gripping feature 135 can be disposed on the outer surface of the body 140 between the top end (where the mating threads 132 are disposed) and the bottom end (where the mating threads 142 are disposed). The gripping feature 135 can be used to hold the body 140 in a stable position and/or to rotate the body 140. Such a use of the gripping feature 135 can assist, for example, when coupling the body 140 to the locking feature 130 and/or to the enclosure 150.

In some cases, the cord grip 100 can also include an optional grounding terminal 120 that can be coupled to the body 140 and/or the locking feature 130. The grounding terminal 120 can be used to secure a ground wire 122 and maintain an electrical ground between the cord grip 100 and the enclosure 150.

A number of problems exist with the cord grip 100 (and other similar cord grips) currently used in the art, however. For example, the locking feature 130 is often not able to prevent fluids from flowing therethrough, particularly if there are multiple conductors 100 that traverse the hole in the locking feature 130. As a result, such fluids can cause corrosion, electrical shorts and/or a number of other problems that can affect the electrical operation of the system in which the cord grip 100 is used.

Another problem with the cord grip 100 is that at least one end of each conductor 110 that runs through the cord grip 100 must be free (e.g., not coupled to a device or otherwise terminated) so that the conductor 110 can run through the cavities of the body 140 and the locking feature 130, as well as the hold in the griping member. This means that adding, removing, and/or replacing a conductor 100 relative to the cord grip 100 can be a cumbersome operation for a user. Example cord grips described herein can solve these and other problems that exist with currently-known cord grips.

Figure 2:
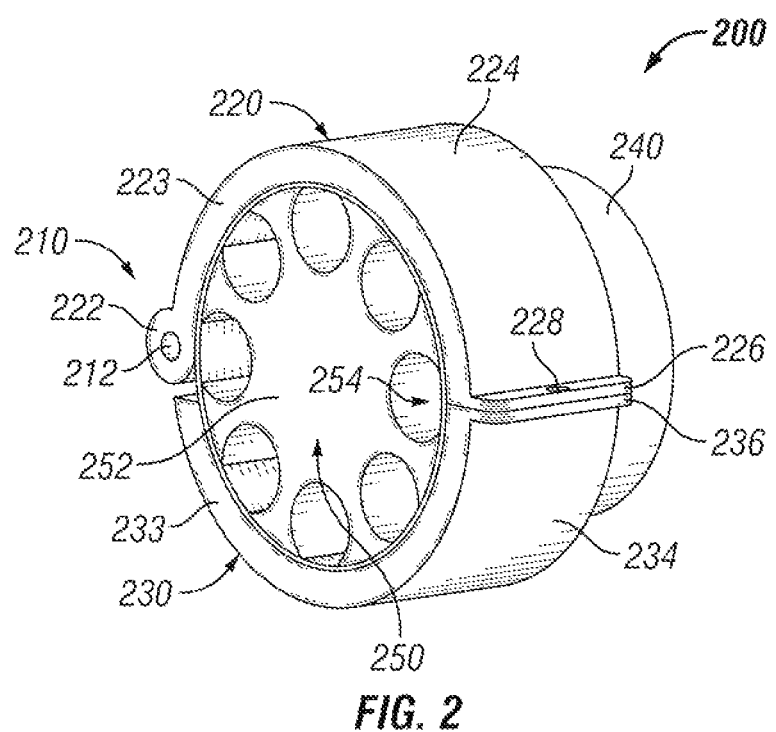
FIG. 2 shows a perspective view of an example cord grip in accordance with certain example embodiments.

FIG. 2 shows a perspective view of an example cord grip 200 in accordance with certain example embodiments. In one or more embodiments, one or more of the components or elements shown in FIG. 2 may be omitted, repeated, and/or substituted. Accordingly, embodiments of a cord grip used in an electrical system should not be considered limited to the specific configuration shown in FIG. 2.

Referring now to FIGS. 1 and 2, the cord grip 200 includes an frame 210 and a damming device 250. The damming device 250 can include one or more receiving portions 254 through which one or more conductors 110 can be passed. Each receiving portion 254 traverses some or all of body of the damming device 250. Each receiving portion 254 begins at the top surface 252. The damming device 250 described herein can be made of a flexible elastomeric material. Examples of such flexible elastomeric material can include, but are not limited to, synthetic rubbers produced by polymerization of chloroprene, such as neoprene, polychloroprene, urethane, and silicone. In addition, or in the alternative, the flexible elastomeric material can include a butyl compound.

The damming device 250 can be made as a single piece (e.g., made from a single mold) or as multiple pieces that are mechanically coupled together. In the latter case, the multiple pieces can be mechanically coupled using one or more of a number of methods, including but not limited to epoxy, melting, fusion, a fastening device, and a clamping device. The damming device 250 can also be called by other names, including but not limited to a damming mechanism and an armor stop. Additional details of the damming device 250 are described below with respect to FIGS. 3A-3C.

In certain example embodiments, the frame 210 is made of two or more pieces that are mechanically coupled to each other. For example, the frame 210 shown in FIG. 2 includes a first portion 220 and a second portion 230. In this case, the first portion 220 and the second portion 230 are moveably (e.g., hingedly, slidably, rotatably) coupled to each other on one side and are detachably coupled to each other on the other side. At the hinged coupling, the first portion 220 can include a coupling feature 222, while the second portion 230 can include a complementary coupling feature (hidden from view). These coupling features, when properly aligned, form a channel through which a pin 212 can be inserted and allow the rotational movement of the first portion 220 and the second portion 230 relative to each other.

At the detachable coupling, the first portion 220 can include a flange 226 having an aperture 228 that traverses therethrough. Collectively, the flange 226 and the aperture 228 can be called a fastening feature. Similarly, the second portion 230 can include a fastening feature that includes a flange 236 having an aperture (hidden from view) that traverses therethrough. When the frame 210 is in a closed position (i.e., when the fastening feature of the first portion 220 and the fastening feature of the second portion 230 are mechanically coupled to each other), the aperture 228 in the flange 226 of the fastening feature of the first portion 220 aligns with the aperture in the flange 236 of the second portion 230. In such a case, one or more fastening devices (not shown) (e.g., a bolt, a screw) can traverse some or all of aperture 228 in the flange 226 and the aperture in the flange 236 to secure the first portion 220 to the second portion 230. One or more additional fastening devices (not shown) (e.g., a nut) can also be used to secure the fastening device that traverses the apertures in the flanges.

The fastening feature of the first portion 220 and/or the fastening feature of the second portion 230 can have one or more of a number of configurations other than a flange with an aperture that traverses therethrough. For example, the fastening feature of the first portion 220 can include a clip that is affixed to the flange 226, where the clip latches into the aperture in the flange 236 of the second portion 230. As another example, the fastening feature of the first portion 220 can include a tab that protrudes away (e.g., downward) from the flange 226, where the tab latches into a slot (part of the fastening feature of the second portion 230) in the flange 236 of the second portion 230. As yet another example, the fastening feature of the first portion 220 can include a rotating latch that latches onto a fastening feature (e.g., protrusion, aperture) of the second portion 230.

While other examples exist, the fastening features of the first portion 220 and the second portion 230 can be coupled and decoupled to allow the frame 210 to be in closed position and an open position. The frame 210 can be in an open position when the first portion 220 and the second portion 230 are mechanically decoupled from each other. In certain example embodiments, the coupling features of the first portion 220 and the second portion 230 are fastening features that can couple and decouple rather than be moveably coupled to each other.

The first portion 220 also includes a front face 223, a side surface 224, and a rear face (hidden from view). Similarly, the second portion 230 includes a front face 233, a side surface 234, and a rear face (hidden from view). The front face 223 of the first portion 220 and the front face 233 of the second portion 230, in part, secures the damming device 250. The inner surfaces of the first portion 220 and the second portion 230 can include one or more of a number of features. For example, inner surfaces of the first portion 220 and the second portion 230 can include a recessed area into which the damming device 250 is disposed when the frame 210 is in the closed position. As another example, the inner surfaces of the first portion 220 and the second portion 230 can include coupling features (e.g., mating threads) that can be used to couple the cord grip 200 to an enclosure 240. Further details of the frame 210 of the cord grip 200 are described below with respect to FIGS. 4A and 43B.

Figure 3A:
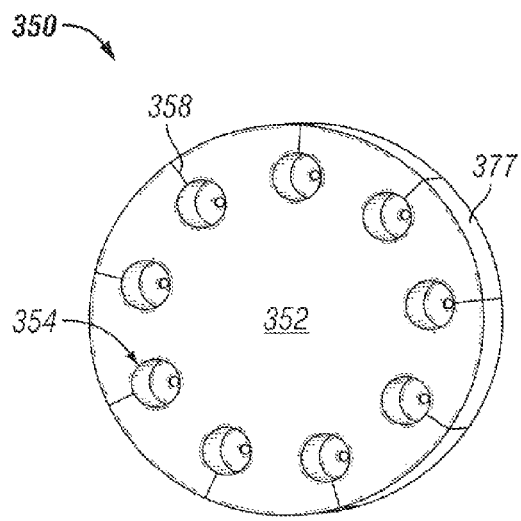
FIGS. 3A-3C show various views of an example damming device of a cord grip in accordance with certain example embodiments.
Figure 3B:
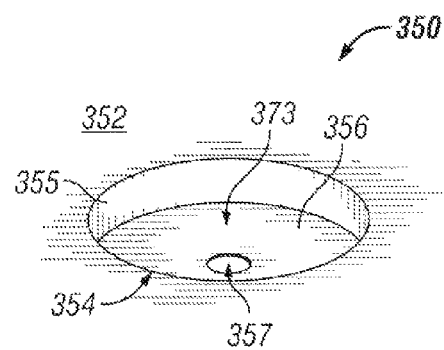
Figure 3C:
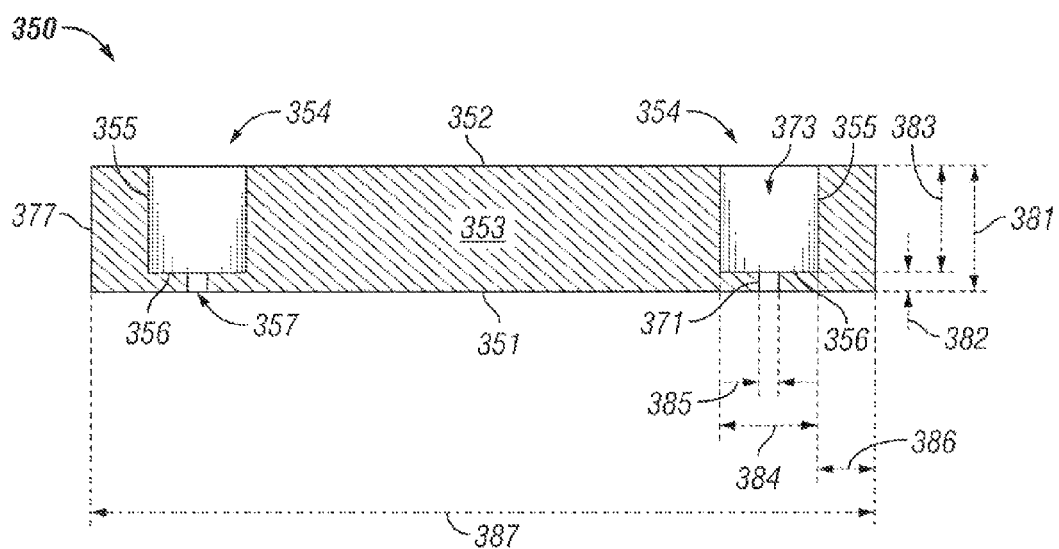

FIGS. 3A-3C show various views of an example damming device 350 of a cord grip in accordance with certain example embodiments. Specifically, FIG. 3A shows a perspective view of the damming device 350. FIG. 3B shows a perspective view of a portion of the damming device 350. FIG. 3C shows a cross-sectional side view of the damming device 350. In one or more embodiments, one or more of the components or elements shown in FIGS. 3A-3C may be omitted, repeated, and/or substituted. Accordingly, embodiments of a damming device should not be considered limited to the specific configuration shown in FIGS. 3A-3C.

Referring to FIGS. 2-3C the damming device 350 can include a body 353 having a thickness 381 and one or more receiving portions 354 disposed within the body 353. The thickness 381 of the body 353 can be defined by a height measured vertically between the top surface 352 and the bottom surface 351 of the body 353. The thickness 381 of the body 353 can be substantially uniform or variable throughout the body 353. The body 353 can also have a width 387 (e.g., diameter) measured horizontally across the body 353 between the sides 377.

As discussed above, the body 353 can be made of one or more of a number of flexible elastomeric materials. The shape of the cross-sectional area of the body 353 can be any of a number of shapes, including but not limited to a circle (as shown in FIG. 3A), an oval, and a square. The shape of the cross-sectional area of the body 353 can be substantially similar to the shape of the cross-sectional area of the channel on the receiving feature 225 of the first portion 220 and the receiving feature 235 of the second portion 230 of the frame 210 when the frame 210 is in the closed position. The receiving feature 225 and the receiving feature 235 are described below with respect to FIGS. 4A and 4B.

In certain example embodiments, each receiving portion 354 can include a hole 373. Each hole 373 can be defined by one or more side surfaces 355 and a bottom surface 356. The hole 373 can have a depth 383 that is less than the thickness 381 of the body 353. The depth 383 of the hole 373 can be defined by a height measured vertically between the top surface 352 of the body 353 and a bottom surface 351 of the hole 373. The hole 373 can also have a width 384 (e.g., diameter) measured horizontally across the hole 373 between the sides 355 of the hole 373. The shape of the cross-sectional area of the hole 373 can be any of a number of shapes, including but not limited to a circle (as shown in FIGS. 3A and 3B), an oval, and a square. The shape of the cross-sectional area of the hole 373 can be substantially similar to the shape of the cross-sectional area of the conductor that is disposed within the hole 373.

In certain example embodiments, the damming device 350 can also include at least one aperture 357 disposed through the bottom surface 356 of the hole 373. Each aperture 357 can be defined by one or more side surfaces 371. The aperture 357 can have a depth 382 that is less than the thickness 381 of the body 353 and the depth 383 of the hole 373. The depth 382 of the aperture 357 can be defined by a height measured vertically between the bottom surface 351 of the body 353 and the bottom surface 351 of the hole 373. The aperture 357 can also have a width 385 (e.g., diameter) measured horizontally across the aperture 357 between the sides 371 of the aperture 357.

The shape of the cross-sectional area of the aperture 357 can be any of a number of shapes, including but not limited to a circle (as shown in FIGS. 3A and 3B), an oval, and a square. The shape of the cross-sectional area of the aperture 357 can be substantially similar to the shape of the cross-sectional area of the conductor that is disposed within the aperture 357. In certain example embodiments, the width 384 of the hole 373 is greater than the width 385 of the aperture 357. In addition, or in the alternative, the depth 382 of the aperture 357 can be the difference between the thickness 381 of the body 353 and the depth 383 of the hole 373.

In certain example embodiments, when a conductor is inserted into an aperture 357, the aperture 357 (or, more specifically, the wall 371 of the aperture 357) expands to conform to the size and/or shape of the conductor. In such a case, the aperture 357 can form a liquid-tight seal around the conductor, which can prevent fluids from tracking along the conductor from one side of the aperture 357 to the other side of the aperture 357.

The wall 371 of an aperture 357 can be vertical through (i.e., perpendicular to) the bottom surface 356 of the hole 373. Similarly, the side 355 of a hole 373 can be vertical through the top surface 352 of the body 353. Alternatively, the wall 371 of an aperture 357 can traverse the bottom surface 356 of the hole 373 at a non-normal (non-perpendicular) angle. Similarly, the side 355 of a hole 373 can traverse the top surface 352 of the body 353 at a non-normal (non-perpendicular) angle. Thus, while each hole 373 and aperture 357 described herein are shown and described as being cylindrical, each hole 373 and/or aperture 357 can have one or more other shapes (e.g., conical, trapezoidal, rectangular) when viewed in two or three dimensions. For example, one or more apertures 357 of the damming device 350 may have one shape (e.g., cube), while one or more holes 373 of the damming device 350 can have another shape (e.g., cylinder). Examples of such shapes, when viewed in a two dimensional space, include but are not limited to a circle, an ellipse, a square, a rectangle, a hexagon, an octagon, and five-point star.

In certain example embodiments, the walls 355 of a hole 373 and/or the walls 371 of a aperture 357 are tapered (e.g., antiparallel with the sides 377 of the body 353). When the holes 773, apertures 357, and/or any other portion of the damming device 350 are substantially circular, each may be defined in terms of one or more radii or diameters. Similarly, the holes 373, apertures 357, and/or any other portion of the damming device 350 can be defined by one or more other terms appropriate for the shape of the holes 373, apertures 357, and/or any other portion of the damming device 350. For example, while a circular hole 373 is described below with respect to a diameter, the circular hole 373 may also be described with respect to one or more other terms, including but not limited to a radius, a circumference, a volume, and an area. Similarly, other holes 373 having other shapes can be described using one or more terms appropriate to that shape. The junction between a hole 373, an aperture 357, and/or any other portion of the damming device 350 can be formed as a pointed edge or a rounded edge.

In certain example embodiments, the damming device 350 can include multiple receiving portions 354. For example, as shown in FIG. 2, the damming device 250 can include 8 receiving portions 254. As another example, as shown in FIG. 3A, the damming device 350 can include 9 receiving portions 354. The receiving portions 354 can be positioned symmetrically around the center of the body 353 of the damming device 350 and/or randomly on the damming device 350. In certain example embodiments, each receiving portion 354 is positioned a certain distance 386 from the side 377 of the body 353. As explained below with respect to FIGS. 4A and 4B, the distance 386 can be at least as great as the height of the receiving feature 225 of the first portion 220 and the height of the receiving feature 235 of the second portion 230 of the frame 210.

Each receiving portion 354 can include a slot 358. In certain example embodiments, the slot 358 extends radially from the aperture 357 of the receiving portion 354 to the outer edge (side 377) of the damming device 350. A slot 358 can have any of a number of thicknesses (widths), including substantially no thickness, as shown in FIG. 3A. Because the material of the damming device 350 (or, at least, along the outer edge of the damming device 350) is flexible, a conductor 110 can be slid or otherwise moved through the slot 358 and be disposed within a receiving portion 354. For example, a conductor 110 can be disposed in the hole 373 and the aperture 357 of a receiving portion 354 by inserting the conductor 110 lengthwise through the slot 358.

In certain example embodiments, the body 353 of the damming device 350 is made of one or more materials that are different than the materials used in and around the receiving portions 354. For example, the receiving portions 354 may be made of rubber. In addition, a metallic material can be bonded and/or co-molded with the center portion of the body 353 of the damming device 100 to provide additional stiffness.

Figure 4A:
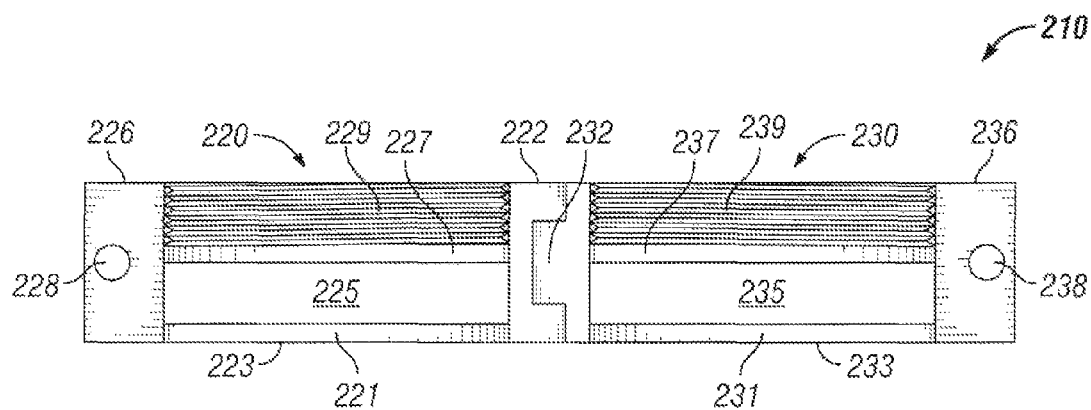
FIGS. 4A and 4B show various views of an example frame of a cord grip in accordance with certain example embodiments.
Figure 4B:
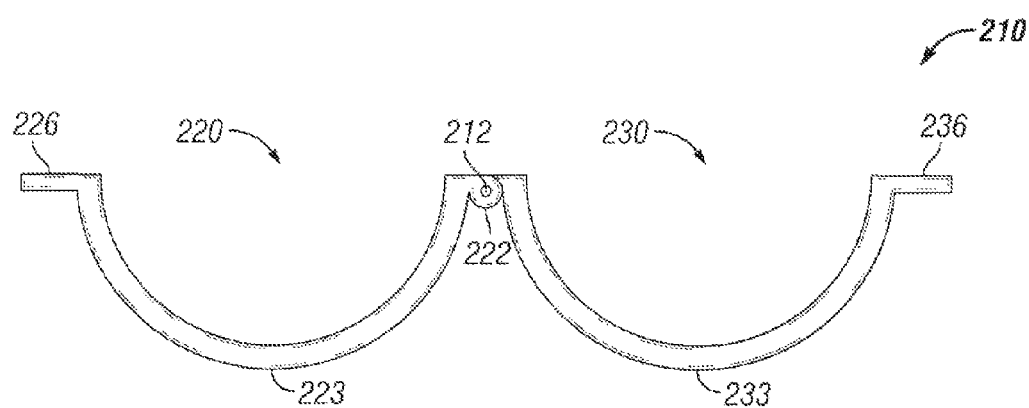

FIGS. 4A and 4B show various views of an example frame 210 of a cord grip in accordance with certain example embodiments. Specifically, FIG. 4A shows a top view of the frame 210 when the frame 210 is in the fully-open position. FIG. 4B shows a side view of the frame 210 when the frame 210 is in the fully-open position. In one or more embodiments, one or more of the of the components or elements shown in FIGS. 4A and 4B may be omitted, repeated, and/or substituted. Accordingly, embodiments of a frame of a cord grip should not be considered limited to the specific configuration shown in FIGS. 4A and 4B.

Referring to FIGS. 2-4B, in certain example embodiments, the frame 210 includes a first portion 220 and a second portion 230 that mechanically couple to each other. The first portion 220 and the second portion 230 can be coupled to each other in one or more of a number of ways and in one or more of a number of locations. For example, the first portion 220 can include a coupling feature 222 located at one end of the first portion 220, and the second portion 230 can include a coupling feature 232 located at one end of the second portion 230. The coupling feature 222 and the coupling feature 232 can be aligned with each other and configured to couple (e.g., rotatably, removably) the first portion 220 and the second portion 230 to each other.

The coupling feature 222 and the coupling feature 232 can be complementary to each other so that the coupling feature 222 can couple to the coupling feature 232. For example, the coupling feature 222 and the coupling feature 232 can each have a cavity that traverses therethrough, where the cavity of the coupling feature 222 can align with the cavity of the coupling feature 232. When the cavities are aligned, a coupling device 212 (e.g., a pin) can be disposed within the cavities so that the first portion 220 and/or the second portion 230 can rotate around the coupling device 212 and allow the frame 210 to change state between a fully-closed position, a fully-open position, and any partially-open position.

As another example, the first portion 220 can include a fastening feature 226 located at one end of the first portion 220 opposite from where the coupling feature 222 is disposed. The second portion 230 can include a fastening feature 236 located at one end of the second portion 230 opposite from where the coupling feature 232 is disposed. The fastening feature 226 and the fastening feature 236 can be aligned with each other and configured to couple (e.g., removably detachably) the first portion 220 and the second portion 230 to each other.

The fastening feature 226 and the fastening feature 236 can be complementary to each other so that the fastening feature 226 can couple to the fastening feature 236. For example, the fastening feature 226 can have an aperture 228 that traverses therethrough, and the fastening feature 236 can each have an aperture 238 that traverses therethrough. When the frame 210 is in the fully-closed position, the aperture 228 of the fastening feature 226 can align with the aperture 238 of the fastening feature 238. When the apertures are aligned, one or more of a number of fastening devices (not shown) (e.g., a screw, a bolt, a clip, a nut) can be disposed through the apertures to keep the first portion 220 and the second portion 230 of the frame 210 in a fully-enclosed position.

In addition to, or in the alternative of, an aperture 228 in the fastening feature 226 and/or an aperture 238 in the fastening feature 236, one or more of another of fastening features (e.g., snaps, tabs, slots, clips) can be used, with or without the use of one or more additional fastening devices (e.g., screw, bolt, nut). The mechanical coupling of the fastening feature 226 and the fastening feature 236 can allow for relatively quick access to the conductors 110 that traverse therethrough. Thus, the example cord grip 200 can be referred to as a quick-release cord grip.

In certain example embodiments, each of the first portion 220 and the second portion 230 can include one or more of a number of receiving features disposed along an interior surface. For example, as shown in FIG. 4A, the first portion 220 can have receiving feature 225 disposed along a portion of the interior surface of the first portion 220. In addition, the second portion 230 can have receiving feature 235 disposed along a portion of the interior surface of the second portion 230. The receiving feature 225 and the receiving feature 235 can have the same dimensions (e.g., depth, thickness). In addition, the receiving feature 225 and the receiving feature 235 can be aligned with each other when the coupling feature 222 is mechanically coupled to the coupling feature 232.

In certain example embodiments, the receiving feature 225 of the first portion 220 can be disposed between inner surface 221 and inner surface 227. The inner surface 221 and the inner surface 227 can have substantially the same depth, which can be less than the depth of the receiving feature 225. In other words, the receiving feature 225 can be recessed relative to the inner surface 221 and inner surface 227. The inner surface 221 can be positioned adjacent to a front face 223 of the first portion 220. Similarly, the receiving feature 235 of the second portion 230 can be disposed between inner surface 231 and inner surface 237. The inner surface 231 and the inner surface 237 can have substantially the same depth, which can be less than the depth of the receiving feature 235. In other words, the receiving feature 235 can be recessed relative to the inner surface 231 and inner surface 237. The inner surface 231 can be positioned adjacent to a front face 233 of the second portion 230.

The thickness or height of the receiving feature 225 and the receiving feature 235 can be substantially the same as the thickness of the damming device 350 (or, at least, the thickness of the outer portions of the damming device 350). Thus, the damming device 350 can be disposed within some or all of the receiving feature 225 and/or the receiving feature 235 when the frame 210 is in at least a partially-open position. When the frame 210 is in a fully-closed position, the entire outer edge of the damming device 350 can be disposed within the receiving feature 225 and the receiving feature 235.

Further, because the inner surfaces (i.e., inner surface 221 and inner surface 227) adjacent to the receiving feature 225 are not recessed as far as the receiving feature 225, and because the inner surfaces (i.e., inner surface 231 and inner surface 237) adjacent to the receiving feature 235 are not recessed as fir as the receiving feature 235, the damming device 350 is prevented from moving laterally within the frame 210 when the frame 210 is in the closed position. When the frame 210 is in at least a partially-open position, the damming device 350 can be moved within the receiving feature 225 and/or the receiving feature 235, or the damming device 350 can be removed from the receiving feature 225 and the receiving feature 235.

In certain example embodiments, the diameter of the damming device 350 is slightly greater than the diameter of the shape formed by the receiving feature 225 and the receiving feature 235 when the frame 210 is in the closed position. In such a case, when the frame 210 is in a fully closed position, an inward force is applied by the first portion 220 and the second portion 230 against the damming device 350. The inward force can cause any gap (thickness) in the slots 358 to close. In addition, or in the alternative, the inward fi-rce can cause the aperture 357 in each receiving portion 354 to close, creating more of a liquid-tight seal around the annulus of the conductor 110 that is disposed within the receiving portion 354.

In certain example embodiments, the distance between the receiving feature 225 and the inner surface 221 of the first portion 220 is less than the distance between the outer edge 377 of the and the side surface 355 of a hole 373 of the damming device 350. Similarly, the distance between the receiving feature 235 and the inner surface 231 of the second portion 230 is less than the distance between the outer edge 377 of the and the side surface 355 of a hole 373 of the damming device 350. In other words, no part of a receiving portion 354 of the damming device 350 is overlapped by the inner surface 221 or the inner surface 231 because the hole 373 is disposed inside of an area formed by the inner surface 221 of the first portion 220 and the inner surface 231 of the second portion 230 when the first portion 220 and the second portion 230 are mechanically coupled to each other.

The first portion 220 can also include an additional coupling feature 229. Similarly, the second portion 230 can include an additional coupling feature 239. Such additional coupling features can be used to mechanically couple the frame 210 to an enclosure (e.g., enclosure 120, enclosure 240). When the frame 210 is in the closed position, the additional coupling feature 229 and the additional coupling feature 239 can form a single coupling feature. The coupling feature formed by the additional coupling feature 229 and/or the additional coupling feature 239 can allow the frame 210 to couple to the enclosure in one or more of a number of ways, including but not limited to fixedly, slidably, removably, and rotatably.

The additional coupling feature 229 and/or the additional coupling feature 239 can be one or more of any type of coupling feature. Examples of such coupling features can include, but are not limited to, mating threads (as shown in FIG. 4A), compression fittings, slots, tabs, apertures, and clips. Such coupling features can be configured to receive and mate with one or more corresponding coupling features of the enclosure.

In certain example embodiments, additional coupling features can be disposed on the inner surface 221 of the first portion 220 and/or the inner surface 231 of the second portion 230. In such a case, the additional coupling features can be the same or different than the additional coupling feature 229 and/or the additional coupling feature 239, and can be used to mechanically couple the frame 210 to some other component (e.g., another enclosure) of a wiring system.

Figure 5:
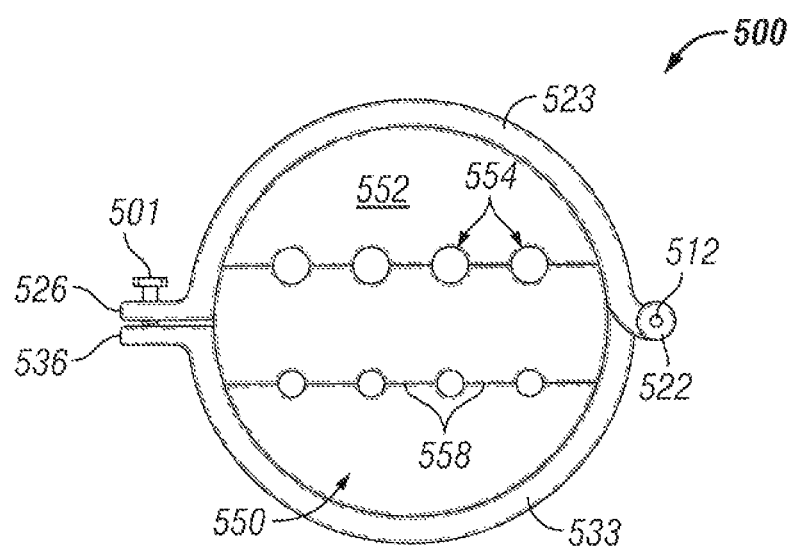
FIG. 5 shows a frontal view of another example cord grip in accordance with certain example embodiments.

FIG. 5 shows a frontal view of another example cord grip 500 in accordance with certain example embodiments. In one or more embodiments, one or more of the components or elements shown in FIG. 5 may be omitted, repeated, and/or substituted. Accordingly, embodiments of a cord grip should not be considered limited to the specific configuration shown in FIG. 5. The example cord grip 500 of FIG. 5 is substantially similar to the cord grip 200 described above with respect to FIG. 2, with the following exceptions.

Referring to FIGS. 2-5, the damming device 550 of the example cord grip 500 has a different configuration than the damming device 250 shown in FIG. 2. In this case, the damming device 550 includes two substantially parallel rows of 4 receiving portions 554. Each receiving portion 554 in a row has at least one slot 558 extending therefrom to another receiving portion 554 in the row or toward the outer edge of the damming device 550. As described above, each receiving potion 554 begins at the top surface 552.

Alternatively, the damming device 550 can have one row of receiving portions 554 or more than two rows of receiving portions 554. A row can have less than four receiving portions 554 or more than four receiving portions 554. For multiple rows of receiving portions 554, each row can be the same (e.g., same number of receiving portions 554, same size of receiving portions 554, same spacing between receiving portions 554, same orientation of slots 558) or different than the other rows. In certain example embodiments, the receiving portions 554 are laid out on the body of the damming device 550 in a random fashion. Similarly, the slots 558 can be laid out randomly or in a particular pattern. A slot 558 can connect two or more receiving portions 554.

The damming device 550 can be replaceable and/or configurable. For example, a number of pre-manufactured damming devices 550, each having a different configuration (e.g., number/size/placement of receiving portions 554, number/size/placement of slots 558). In such a case, a user can use and/or replace a damming device 550 based on a particular electrical system. As another example, a damming device can be a solid elastomeric piece with no slots 558 or receiving portions 554. In such a case, a user can use a special tool that can be used to create receiving portions 554 and/or slots 558 in accordance with the user's requirements for a particular application.

Example embodiments described herein provide for a quick-release cord grip. Specifically, example embodiments are directed to a cord grip that includes a frame that separates to expose a damming device. When the frame is in an open position, the example damming device is movable or removable. Further, one or more conductors can be inserted into the damming device through one or more slots in the damming device. When the frame is in a closed position, the damming device is secured within the frame.

The damming device of the example cord grip can create a liquid-tight seal around the annulus of the one or more conductors that pass through the damming device while the damming device is positioned within the frame. As a result, little to no fluids can contaminate part of an electrical system. Thus, electrical problems (e.g., ground faults) and mechanical problems (e.g., corrosion) caused by fluids that track into an enclosure along the annulus of a conductor can be reduced or eliminated using example cord grips described herein.

Also, the accessibility of the damming device by the detachable portions of the frame, as well as the slots in the damming device, allow for easy maintenance and installation of conductors and/or associated equipment. Thus, time, costs, and material can be saved using example embodiments described herein.

Although the embodiments herein are described with reference to preferred and/or example embodiments, it should be appreciated by those skilled in the art that various modifications are well within the scope and spirit of this disclosure. From the foregoing, it will be appreciated that embodiments herein overcome the limitations of the prior art. Those skilled in the art will appreciate that the example embodiments are not limited to any specifically discussed application and that the embodiments described herein are illustrative and not restrictive. From the description of the example embodiments, equivalents of the elements shown therein will suggest themselves to those skilled in the art, and ways of constructing other embodiments will suggest themselves to practitioners of the art. Therefore, the scope of the example embodiments is not limited herein.

What is claimed is:

1. A quick-release cord grip, comprising:
a damming device through which at least one conductor traverses, wherein the damming device comprises a side surface disposed between a top surface of the damming device and a bottom surface of the damming device; and
a frame mechanically coupled to the damming device, wherein the frame comprises:
a first portion comprising a first receiving feature, a first inner surface, a first coupling feature, and a first fastening feature; and
a second portion comprising a second receiving feature, a second inner surface, a second coupling feature, and a second fastening feature,
wherein the first coupling feature and the second coupling feature are movably coupled to each other,
wherein the first fastening feature and the second fastening feature are detachably coupled to each other, and
wherein the entire side surface of the damming device is disposed within the first receiving feature and the second receiving feature when the first fastening feature and the second fastening feature are mechanically coupled to each other.

2. The quick-release cord grip of claim 1, wherein the damming device further comprises:
a body having a first thickness and comprising a flexible elastomeric material;
at least one receiving portion disposed within the body, wherein the at least one receiving portion comprises:
a hole comprising a height and a first diameter; and
an aperture disposed at a bottom of the hole, wherein the aperture comprises a second thickness and a second diameter,
wherein the first diameter is greater than the second diameter, and
wherein the second thickness is the difference between the first thickness and the height.

3. The quick-release cord grip of claim 2, wherein the hole in the at least one receiving portion is among a plurality of holes disposed in a plurality of receiving portions.

4. The quick-release cord grip of claim 3, wherein the plurality of holes is symmetrically positioned around a center of the damming device.

5. The quick-release cord grip of claim 2, wherein the at least one receiving portion further comprises a slot that extends radially from the aperture to an outer perimeter of the body of the damming device, wherein the slot has the first thickness.

6. The quick-release cord grip of claim 5, wherein the at least one conductor is disposed in the hole and the aperture of the at least one receiving portion by inserting the at least one conductor lengthwise through the slot.

7. The quick-release cord grip of claim 2, wherein the hole is disposed inside of an area formed by a first inner surface of the first portion and a second inner surface of the second portion when the first portion and the second portion are mechanically coupled to each other, wherein the first inner surface is adjacent to the first receiving feature, and wherein the second inner surface is adjacent to the second receiving feature.

8. The quick-release cord grip of claim 2, wherein the aperture expands when receiving the at least one conductor to form a liquid-tight seal.

9. The quick-release cord grip of claim 1, wherein the first coupling feature and the second coupling feature are hingedly coupled to each other.

10. The quick-release cord grip of claim 1, wherein the frame is in a closed position when the first fastening feature of the first portion and the second fastening feature of the second portion are mechanically coupled to each other, and wherein the frame is in an open position when the first fastening feature of the first portion and the second fastening feature of the second portion are mechanically decoupled from each other.

11. The quick-release cord grip of claim 10, wherein the damming device is removable from the first receiving feature and the second receiving feature when the frame is in the open position.

12. The quick-release cord grip of claim 1, wherein the first portion further comprises a third coupling feature, wherein the second portion further comprises a fourth coupling feature, wherein the third coupling feature and the fourth coupling feature receive a corresponding coupling feature of an enclosure.

13. The quick-release cord grip of claim 1, further comprising:
    at least one fastening device removably coupled to the first fastening feature of the first portion and the second fastening feature of the second portion.

14. A wiring system, comprising:
    an enclosure comprising at least one wall forming a cavity, wherein the at least one wall comprises a first aperture that traverses therethrough;
    at least one conductor disposed within the cavity and that traverses the first aperture; and
    a quick-release cord grip mechanically coupled to the enclosure at the first aperture, wherein the quick-release cord grip comprises:
        a damming device through which the at least one conductor traverses, wherein the damming device comprises a side surface disposed between a top surface of the damming device and a bottom surface of the damming device; and
        a frame comprising:
            a first portion comprising a first receiving feature, a first inner surface, a first coupling feature, and a first fastening feature; and
            a second portion comprising a second receiving feature, a second inner surface, a second coupling feature, and a second fastening feature,
        wherein the first coupling feature and the second coupling feature are movably coupled to each other,
        wherein the first fastening feature and the second fastening feature are detachably coupled to each other, and
        wherein the entire side surface of the damming device is disposed within the first receiving feature and the second receiving feature when the first fastening feature and the second fastening feature are mechanically coupled to each other.

15. The wiring system of claim 14, wherein the first portion further comprises a third coupling feature, wherein the second portion further comprises a fourth coupling feature, wherein the third coupling feature and the fourth coupling feature receive a corresponding coupling feature disposed proximate to the first aperture on the enclosure.

16. The wiring system of claim 14, wherein the damming device further comprises:
    a body having a first thickness of a flexible elastomeric material;
    at least one receiving portion disposed within the body, wherein the at least one receiving portion comprises:
        a hole comprising a height and a first diameter; and
        a second aperture disposed at a bottom of the hole, wherein the aperture comprises a second thickness and a second diameter,
    wherein the first diameter is greater than the second diameter, and
    wherein the second thickness is the difference between the first thickness and the height.

17. The wiring system of claim 16, wherein the at least one receiving portion further comprises a slot that extends radially from the second aperture to an outer perimeter of the body of the damming device, wherein the slot has the first thickness.

18. The wiring system of claim 17, wherein the at least one conductor is disposed in the hole and the aperture of the at least one receiving portion by inserting the at least one conductor lengthwise through the slot.

19. The wiring system of claim 18, wherein the second aperture expands when receiving the at least one conductor to form a liquid-tight seal.

20. The wiring system of claim 14, wherein the enclosure is a conduit.

* * * * *